United States Patent [19]

Rosenwald

[11] 3,857,959

[45] Dec. 31, 1974

[54] INHIBITING FUNGICIDAL IMPAIRMENT OF PLANT GROWTH

[75] Inventor: Robert H. Rosenwald, Western Springs, Ill.

[73] Assignee: Universal Oil Products Company, Des Plaines, Ill.

[22] Filed: June 27, 1972

[21] Appl. No.: 266,825

[52] U.S. Cl. ............................................. 424/346
[51] Int. Cl. ......................... A01n 9/00, A01n 9/26
[58] Field of Search ................................... 424/346

[56] References Cited
UNITED STATES PATENTS
2,107,307   2/1938   Rawlins et al. ..................... 424/346

OTHER PUBLICATIONS

Chem. Abst. 60, 13,797, (d-f), (1964), Kajimoto.

Chem. Abst. 63, 1736 (b), (1965), -Alkyl-substituted hydroquinones.

Primary Examiner—Albert T. Meyers
Assistant Examiner—Douglas W. Robinson
Attorney, Agent, or Firm—James R. Hoatson, Jr.; Raymond H. Nelson; William H. Page, III

[57] ABSTRACT

Inhibiting fungicidal impairment of plant growth by applying an alkylhydroquinone to the area thereof.

1 Claim, No Drawings

INHIBITING FUNGICIDAL IMPAIRMENT OF PLANT GROWTH

DESCRIPTION OF THE INVENTION

The present invention relates to a novel method of inhibiting impairment of plant growth due to microbial activity. The microbial activity is inclusive of many different forms, which vary with the particular plant and geographical location.

As hereinbefore set forth, the microbial activity varies with the particular plant. In one embodiment, the plant is of edible nature, including vegetable, fruit, grain, etc. In another embodiment, the plant may be of nonedible nature, including cotton, tobacco, grass, flowers, ornamental plants, etc.

It is generally recognized that the potency of the different icides is very specific. Accordingly, the particular alkylhydroquinone to be utilized will be selected with regard to the particular plant growth. Also, the dosage to be utilized will be sufficient to accomplish the desired purpose but sufficiently low so not to become phytotoxic.

Any suitable alkylhydroquinone may be used in accordance with the present invention. In one embodiment, the alkylhydroquinone is a monoalkylhydroquinone in which the alkyl group contains from 1 to 12 carbon atoms and may be a primary, secondary or tertiary alkyl configuration. In a preferred embodiment, the alkylhydroquinone is a tertiaryalkylhydroquinone in which the tertiary alkyl group contains from four to 12 carbon atoms. Illustrative compounds in this embodiment include t-butylhydroquinone, t-pentylhydroquinone, t-hexylhydroquinone, t-heptylhydroquinone, t-octylhydroquinone, t-nonylhydroquinone, t-decylhydroquinone, t-undecylhydroquinone and t-dodecylhydroquinone.

In another embodiment, the alkylhydroquinone is a dialkylhydroquinone in which each alkyl contains from one to 12 carbon atoms. Here again, in a preferred embodiment, the alkyl groups are of tertiary configuration and contain from four to 12 carbon atoms each. Illustrative compounds in this embodiment include di-t-butylhydroquinone, di-t-pentylhydroquinone, di-t-hexylhydroquinone, di-t-heptylhydroquinone, di-t-octylhydroquinone, di-t-nonylhydroquinone, di-t-decylhydroquinone, di-t-undecylhydroquinone and di-t-dodecylhydroquinone. In a preferred embodiment, the alkyl groups are in the 2,5-positions, although they may be in the 2,3- or 2,6- positions. In another embodiment, the alkyl groups are of different chain length and/or configuration and may be illustrated by the following compounds: 2-methyl-5-t-butylhydroquinone, 2-methyl-5-t-pentylhydroquinone, 2-methyl-5-t-hexylhydroquinone, 2-methyl-5-t-heptylhydroquinone, 2-methyl-5-t-octylhydroquinone, 2-ethyl-5-t-butylhydroquinone, 2-ethyl-5-t-pentylhydroquinone, 2-ethyl-5-t-hexylhydroquinone, 2-ethyl-5-t-heptylhydroquinone, 2-ethyl-5-t-octylhydroquinone, 2-propyl-5-t-butylhydroquinone, 2-propyl-5-t-pentylhydroquinone, 2-propyl-5-t-hexylhydroquinone, 2-propyl-5-t-heptylhydroquinone, 2-propyl-5-t-octylhydroquinone, etc. It is understood that the differently substituted hydroquinones are not necessarily equivalent.

The alkylhydroquinone may be applied to the appropriate area in any suitable manner. In one method, it may be sprayed as a liquid, solution or emulsion, or it may be dusted as a powder onto the seeds prior to actual planting or, in another embodiment, it may be applied to the soil before or subsequent to, but preferably soon after, the planting of the seeds. In some cases, two or more applications of the alkylhydroquinone may be of advantage and will depend upon the particular infestation of the microbes. The amount of alkylhydroquinone to be applied will be sufficient to accomplish the desired purpose but not in excess to become phytotoxic. In general, the amount of alkylhydroquinone on an active ingredient basis may range from 1 g. to 1 Kg. or more per 100 square feet.

The alkylhydroquinone may be utilized neat or as a solution or emulsion. When utilized as a solution, any suitable solvent may be employed and should be compatible with the alkylhydroquinone and itself not toxic or otherwise detrimental to the plant. The solvent may be selected from water, alcohol including ethanol, propanol, butanol, etc., glycol including ethylene glycol, propylene glycol, butylene glycol, diethylene glycol, dipropylene glycol, etc., ketone including acetone, methylethyl ketone, diethyl ketone, ethylpropyl ketone, dipropyl ketone, etc., ether including diethyl ether, ethylpropyl ether, dipropyl ether, methylbutyl ether, ethylbutyl ether, propylbutyl ether, dibutyl ether, etc., dimethyl sulfoxide, diethyl sulfoxide, dimethyl acetamide, vegetable oil, etc. It is understood that any suitable solvent or mixtures thereof may be utilized for this purpose.

When the alkylhydroquinone is utilized as an emulsion, it may be with or without water. Any suitable emulsifying agent may be used. Here again, the emulsifying agent must be compatible with the alkylhydroquinone and itself not toxic or otherwise detrimental to the plant. In one embodiment, these are alkylene oxide adducts and particularly polyoxyethylene or polyoxypropylene sorbitan fatty acid esters as, for example, polyoxyethylene sorbitan monooleates, polyoxyethylene sorbitan monolaurates, polyoxyethylene sorbitan monostearates, etc., containing from 1 to 40 and more particularly from 15 to 25 oxyethylene groups. A number of these emulsifiers are available commercially under the trade names of "Tween," "Span," etc. Other emulsifiers include polyoxyalkylene fatty alcohol ethers, polyglycol fatty acid esters, polyalkyleneglycol fatty acid esters, lecithin, etc. Other illustrative emulsifiers include the sulfonates and particularly the alkylated aromatic sulfonates, sulfonated oils as, for example, sulfonated caster oil or other natural oils and fats, sulfuric acid ester salts of long chain alcohols as, for example, sulfonated alcohols derived from hydrogenated coconut oil or other fatty oils, etc. Here again, it is understood that any suitable emulsifying agent or mixture thereof may be utilized in accordance with the present invention.

In still another embodiment, the alkylhydroquinone is applied by dusting. Any suitable dust diluent or carrier may be used and generally will be selected from talcs, clays, silicas, gypsum, calcium carbonate, calcium hydrate, dolomite (natural calcium and magnesium carbonate), soapstone, pyrophyllite, pumicite, starch, etc. The clays include Kaolin, fuller's earth, bentonite, etc. The silicas include diatomaceous earth, pumice, pumicite, "Celite," perlite, etc. The carrier or composite is ground to finely divided particle size and more particularly as powder. The alkylhydroquinone is composited with the powder in any suitable manner.

As hereinbefore set forth, the alkylhydroquinone is applied to the appropriate area in any suitable manner and may be done by hand, machine, airplane, etc. These methods of applying biocides are well known in the industry and, because no novelty is claimed herein for the particular method of applying the alkylhydroquinone, these various methods need not be described in detail herein.

The following examples are introduced to illustrate further the novelty and utility of the present invention but not with the intention of unduly limiting the same.

EXAMPLE I

In-Vitro tests were conducted on agar seeded with spores of *Ceratocystis ulmi*. Strong inhibition zones were formed by t-butylhydroquinone. The t-butylhydroquinone appears to be active against a wide range of fungi including *Alternaria solani*. It, also, is apparently active in a vapor phase causing inhibition of aerial mycelium of *A. solani*.

EXAMPLE II

In field applications, t-butylhydroquinone was incorporated into the soil prior to planting to test its effectiveness in the control of common soil borne diseases of snap beans such as Fusarium root rot and Rhizoctonia stem rot. These diseases are considered to be the factors limiting the development of snap bean production in certain geographical locations.

The t-butylhydroquinone was incorporated in a band 12 inches wide and 6 inches deep. The beans were planted at 1 inch intervals in a row. Efficacy of the compound was rated on the basis of the number of plants that emerged and reached maturity, as well as the severity of lesions. The results of this evaluation, as well as a control plot, are reported in the following table. The snap bean was of the bush Blue Lake variety and the yields are on the basis of 10 foot plots.

TABLE I

| Compound | Emergence[1] | Yield | Disease Involvement[2] |
|---|---|---|---|
| Control | 13 | 4.5 lb. | 3 |
| t-butyl-hydroquinone | 17 | 5.2 lb. | 0 |

[1] Average number of seedlings per 3 foot segment of row (seed planted at one inch spacing).
[2] Disease involvement of roots and hypocotyl rated on basis of 0 – 5. 0 = no disease. 5 — severe lesion development.

From the data in the above table, it will be noted that the t-butylhydroquinone exceeded the control plot in the number of emerged seedlings, in the yield and in freedom from root rots and stem cankers.

EXAMPLE III

In this example, t-butylhydroquinone was composited with clay and then evaluated by dusting for the inhibition of germination of *H. maydis* (T) spores. The evaluation was performed as an agar disc assay, in which inoculation at one spot is made and then the inhibition of germination is determined by the diameter in millimeters of the protected zone. In the control run, treated only with water, there was no inhibition of germination. The plates treated with t-butylhydroquinone produced inhibition zones of 30, 40, 35 and 45 mm diameter. However, when the t-butylhydroquinone was utilized as a solution in this evaluation, no inhibition was observed. Accordingly, the t-butylhydroquinone should be applied as a dust in this use.

EXAMPLE IV

In this example, t-butylhydroquinone was evaluated for the inhibition of *Helminthosporium maydis* T infection on Tms cytoplasm corn seedlings by being applied to plants growing in a greenhouse. A suspension of *Helminthosporium maydis* T spores (approximately 2000 spores/ml) was sprayed onto 14-day old seedlings with an atomizer two days after the t-butylhydroquinone had been applied. Immediately after inoculation, the plants were placed in a moist chamber for a 12-hour incubation period. Following this, the plants were moved back to the greenhouse bench and observed for lesion development. Lesion counts were made on the fifth day. Only the two highest, fully emerged leaves on each plant were used in these counts. The t-butylhydroquinone was applied to six 4 inch pots of plants —four plants per pot.

The results are reported in the following table, in which each datum represents the average number of lesions on two leaves on each of four plants per pot —one pot per replication. Also reported in the following table are the results of untreated plants to serve as a control test for comparative purposes.

TABLE II

| Pots | Replications | | | | | |
|---|---|---|---|---|---|---|
|  | 1 | 2 | 3 | 4 | 5 | 6 |
| Control | 33 | 28 | 42 | 31 | 40 | 29 |
| t-butylhydroquinone | 24 | 18 | 26 | 31 | 27 | 21 |

It will be noted that the t-butylhydroquinone served to reduce the number of lesions in all but one case as compared to the untreated plants.

I claim as my invention:

1. A method of inhibiting fungicidal impairment of plant growth which comprises applying t-butylhydroquinone to the area of said plant growth in an amount of 1g. to 1Kg. per 100 square feet.

* * * * *